(12) United States Patent
Moore, Jr.

(10) Patent No.: US 6,559,432 B1
(45) Date of Patent: May 6, 2003

(54) APPARATUS AND METHODS FOR WELDING FLEXIBLE MATERIAL

(75) Inventor: James B. Moore, Jr., Cincinnati, OH (US)

(73) Assignee: Casco Products, Inc., Cincinnati, OH (US)

(*) Notice: Subject to any disclaimer, the term of this patent is extended or adjusted under 35 U.S.C. 154(b) by 0 days.

(21) Appl. No.: 09/631,316

(22) Filed: Aug. 3, 2000

(51) Int. Cl.[7] .................................................. H05B 6/54
(52) U.S. Cl. ........................ 219/765; 219/777; 219/780; 156/380.2; 156/380.6
(58) Field of Search ................................ 219/765, 767, 219/777, 780, 778; 156/380.1, 380.2, 380.3, 380.4, 380.5, 380.6, 380.7, 380.8

(56) References Cited

U.S. PATENT DOCUMENTS

| | | | |
|---|---|---|---|
| 3,330,716 A | * | 7/1967 | Zelnick .................... 156/380.7 |
| 3,401,248 A | * | 9/1968 | Kim ........................ 219/777 |
| 3,547,743 A | | 12/1970 | Tunner |
| 3,765,099 A | * | 10/1973 | Kohlmannsperger ........ 219/780 |
| 3,982,992 A | | 9/1976 | Moffitt |
| 4,000,029 A | | 12/1976 | Michaels |
| 4,268,338 A | * | 5/1981 | Peterson ..................... 219/777 |
| 4,300,892 A | | 11/1981 | Barnes et al. |
| 4,769,106 A | | 9/1988 | Busching |
| 5,200,123 A | | 4/1993 | Crass |
| 5,245,154 A | * | 9/1993 | Sato et al. .................. 219/777 |
| 5,266,150 A | | 11/1993 | Miller |
| 5,312,507 A | | 5/1994 | Miller |
| 5,403,421 A | | 4/1995 | Hinterseer |
| 5,469,863 A | | 11/1995 | Shah |
| 5,472,549 A | | 12/1995 | Jurrius et al. |
| 5,476,570 A | | 12/1995 | Widmann |
| 5,545,275 A | | 8/1996 | Herrin et al. |
| 5,601,889 A | | 2/1997 | Chundury et al. |
| 5,616,199 A | | 4/1997 | Jurrius et al. |
| 5,635,104 A | | 6/1997 | Kott et al. |
| 5,910,081 A | | 6/1999 | Graham |
| 6,009,925 A | | 1/2000 | Hall et al. |
| 6,073,290 A | | 6/2000 | Miller, Sr. |

FOREIGN PATENT DOCUMENTS

GB        2 053 084    * 2/1981 ............... 156/380.6

* cited by examiner

Primary Examiner—Philip H. Leung
(74) Attorney, Agent, or Firm—Wood, Herron & Evans LLP

(57) ABSTRACT

A fixture for use with a radio-frequency welding press includes an independent electrode that is not attached to a platen of the press and which is used to register directly on flexible material workpieces to locate and hold workpieces during a welding operation. The invention also includes shuttles that slidably move welding fixtures to respective positions beneath and laterally away from press platens so that welding and workpiece removal and loading operations can be performed simultaneously on fixtures mounted to respective shuttles. Methods and alternate embodiments are disclosed.

21 Claims, 4 Drawing Sheets

APPARATUS AND METHODS FOR WELDING FLEXIBLE MATERIAL

FIELD OF THE INVENTION

The present invention pertains to radio-frequency welding, and more particularly, to an apparatus and methods for radio-frequency welding flexible materials.

BACKGROUND OF THE INVENTION

It is often desirable to join together flexible thermoplastic materials, such as vinyl sheeting or coated fabrics, without stitching that would create holes in the materials through which liquid could penetrate. A common method for forming such a joint is by welding two or more flexible materials together using radio-frequency (R-F) welding, also known as high-frequency welding. R-F welding fuses materials together to form an integral weld, thereby eliminating the need to stitch the materials together. Thus, R-F welded joints are particularly useful in the manufacture of articles such as hospital mattress covers, as described in U.S. Pat. No. 5,910,081 to Graham, where the prevention of liquid penetration is critical for health and safety reasons.

Prior methods of forming R-F welds in flexible materials have involved the use of bar presses, where a single, elongated electrode bar is attached to a moveable upper or lower platen of the press. An operator typically positions the materials desired to be joined on a lower platen of the press, usually registering the material in a jig to ensure proper alignment of the weld with respect to the materials. Once the materials are in position, the upper platen and attached electrode bar are lowered so that the materials are compressed between the electrode bar and the bottom platen. Radio-frequency energy is applied to the electrode bar while the materials are being compressed in order to weld the materials together.

If the length of the desired weld joint is longer than the length of the electrode bar, the operator must raise the upper platen and reorient the workpiece to position an unwelded portion of the workpiece beneath the electrode bar. The press must be closed another time to weld the materials at the new location. In this manner, two or more successive workpiece-positioning and press-closing operations may be required to create long weld sections. These multiple, repeated operations result in manufacturing inefficiencies and long cycle times in the production a welded article.

Further manufacturing inefficiencies result from the fact that workpiece positioning operations must be performed while the press is open, and is thus inoperative and underutilized. These inefficiencies and equipment underutilizations drive up manufacturing costs, making the manufacturer less competitive in the marketplace.

Accordingly, there is a need for an apparatus and methods for R-F welding flexible materials that provide decreased cycle times per workpiece and increased press utilization while continuing to provide quality indexed welds in properly aligned materials. Thus it is an object of the present invention to provide an apparatus for use with an R-F press that will reduce cycle times and increase press utilization.

It is a further object of the invention to provide methods of R-F welding that will reduce cycle times and increase press utilization.

SUMMARY OF THE INVENTION

The present invention provides an apparatus and methods which increase manufacturing efficiencies and utilization of press equipment in welding flexible materials. In accordance with one aspect of the present invention, an apparatus for use in a welding press includes a base with a work surface and an electrode independent of and not attached to a platen of the press. The base and electrode have corresponding electrode locating features and the electrode is used to directly register on a workpiece when the electrode is positioned on the base. Because the electrode of the present invention is used to locate and hold the workpiece, the invention provides an advantage over prior R-F presses by eliminating the need for extensive fixturing to locate and hold a workpiece relative to an electrode which is generally attached to a moving platen of the press. According to the invention, set-up operation can be conducted in an area spaced from the moving platen and not restricted by it.

In another aspect of the present invention, multiple electrodes may be used on a single base to create multiple welds in the same workpiece in each cycle, or alternatively, multiple welds in different workpieces in each cycle. The present invention thus provides increased throughput per press-closing operation, compared to conventional bar presses which generally have a single electrode and can only weld a single section during each press-closing operation.

In a further aspect of the present invention, a base is mounted to a shuttle that can be slidably moved beneath and out from under a press platen. The electrode is disposed on the base in a fixture on the shuttle. Thus, electrode to work piece indexing is provided outside the closed platen station. When two or more bases and shuttles are used in a single press, the present invention reduces press underutilization and increases manufacturing efficiency by allowing multiple operators to perform both welding and workpiece positioning operations simultaneously.

In another aspect of the invention, a method for R-F welding flexible materials includes the steps of orienting a workpiece on a fixture; placing an electrode on the fixture to register and hold the workpiece; moving the electrode, fixture, and workpiece into a welding press; applying pressure and energy to the electrode; removing the electrode, fixture, and workpiece from the press; and removing the workpiece from the fixture.

In yet another aspect of the invention, shuttles and bases are used with conventional bar presses to increase utilization of bar press equipment. Accordingly, another aspect of the present invention contemplates a method of using a shuttle with a conventional bar press, including the steps of orienting a workpiece on a work surface, using a shuttle to slide the workpiece beneath a platen and electrode of the press, closing the press and applying pressure and radio-frequency energy to the electrode, opening the press, sliding the shuttle out from under the platen, and removing the workpiece from the work surface.

These and other aspects of the invention will be apparent from the following description, claims, and attached drawings.

DETAILED DESCRIPTION OF THE PREFERRED EMBODIMENT

Figure 1:
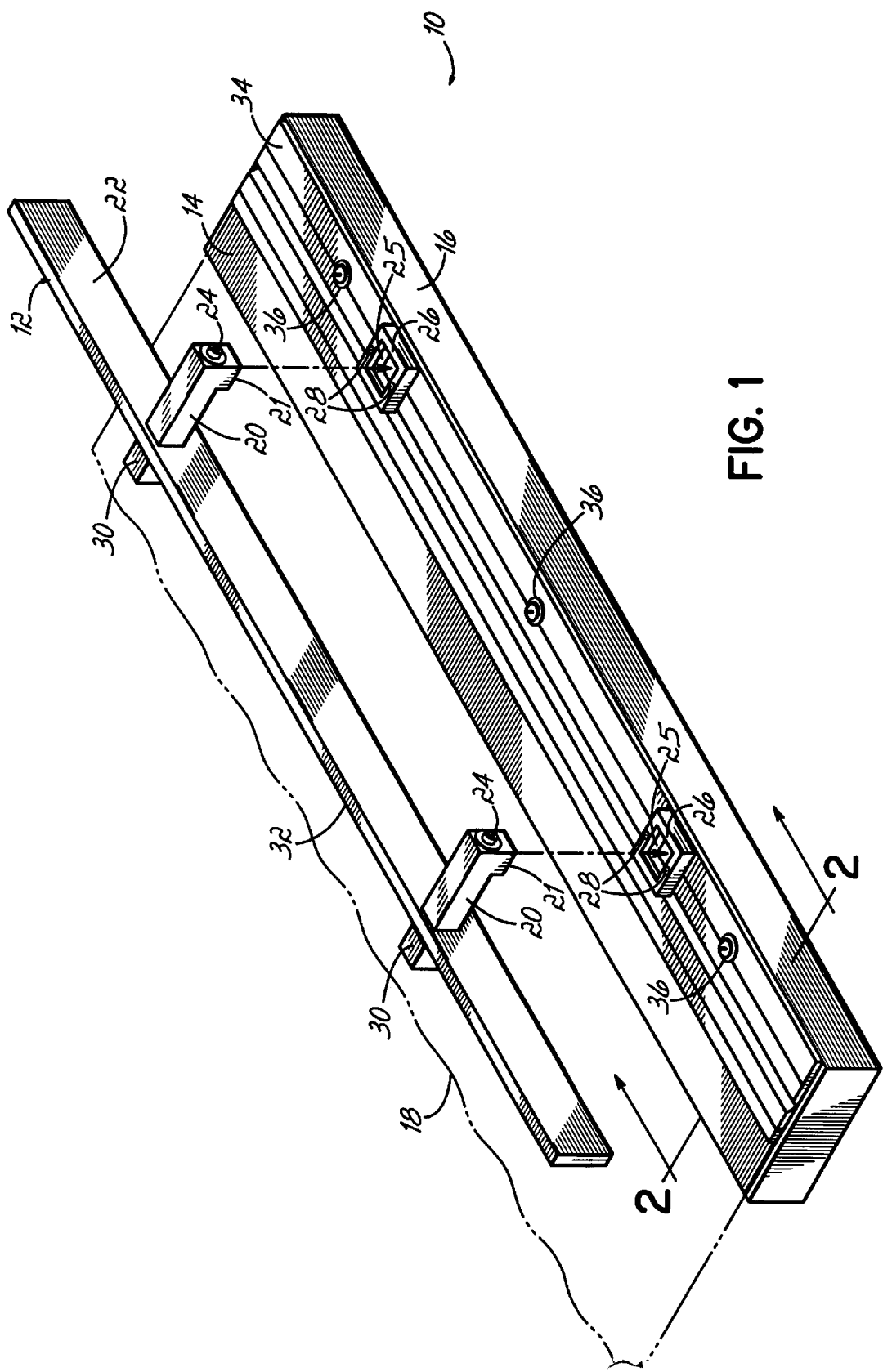
FIG. 1 is a perspective view of a preferred embodiment of the present invention.
Figure 2:
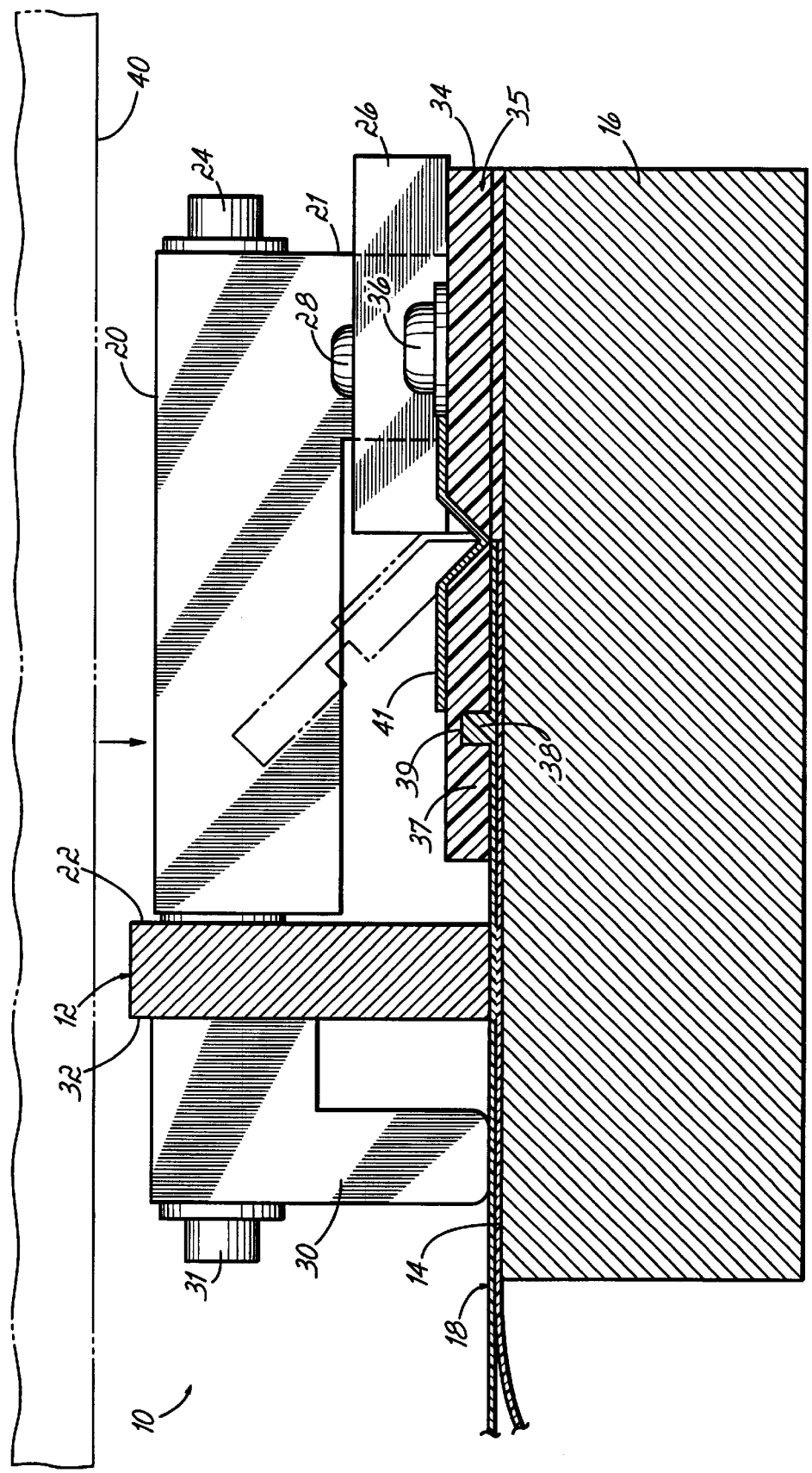
FIG. 2 is a cross-sectional view of the apparatus of FIG. 1, taken along line 2—2 of FIG. 1.

Referring to FIGS. 1 and 2, a fixture 10 for use with an R-F welding press includes an independent electrode 12 that is not attached to a platen of the press. The electrode 12 is configured to be indexed in position with respect to the work surface 14 of a base 16 to positively register and hold flexible material workpieces 18 that are oriented on the work surface 14. A pair of first electrode locating members 20 are attached to a first side 22 of the electrode 12 with cap screws 24 and are shaped to operatively engage corresponding positioning features 26 mounted on the base 16 with fasteners 28.

In a preferred embodiment, positioning features 26 are bosses with recesses 25 shaped to accept correspondingly configured ends 21 of the electrode locating members 20. A pair of second electrode locating members 30 are attached to a second side 32 of electrode 12 with fasteners 31 and are shaped to control the position of the electrode 12 with respect to the workpiece 18 and the work surface 14 when the workpiece materials 18 are being fused together during a welding operation.

A workpiece positioning member 34 is attached to the work surface 14 with fasteners 36 and, together with the bosses 26 and electrode locating members 20, provides proper orientation of the workpiece relative to the electrode 12. In a preferred embodiment, the workpiece positioning member 34 comprises two hinged plates 35, 37. Plate 37 includes a relieved channel 39 for positively accommodating a feature of the workpiece such as a zipper 38 (diagrammatically illustrated). Plates 35, 37 may be hinged to any suitable means, including tape 41. Plate 37 can be lifted, as illustrated by the phantom lines in FIG. 2, for receiving workpiece material thereunder prior to positioning of electrode 12.

Referring to FIG. 2, articles of flexible material 18 may be joined under electrode 12 together in an R-F press using the fixture 10, described above, as follows. A flexible material workpiece 18 of two parts to be welded is oriented on the work surface 14 of the fixture 10 by placing the workpiece 18 under the workpiece positioning member 34, and plate 37, so that a workpiece feature, such as a zipper, is accommodated by groove 39. Electrode 12 is then placed over the workpiece 18 so that the first electrode positioning members 20 at ends 21 engage the corresponding recesses 25 in bosses 26 of the base 16 and so that the second electrode positioning members 30 contact the workpiece 18. Thereafter, a platen 40 of the press is lowered to contact the electrode 12 and thereby compress electrode 12 against the workpiece 18. Radio-frequency energy is then applied to electrode 12 by the press, which causes the individual materials of the workpiece to become fused together beneath the electrode 12. In an even more preferred embodiment of the present invention, multiple electrodes 12 are used with multiple work surfaces 14 on a given base to form multiple welds on a single workpiece 18 or, alternatively, multiple welds on different workpieces.

Figure 3:
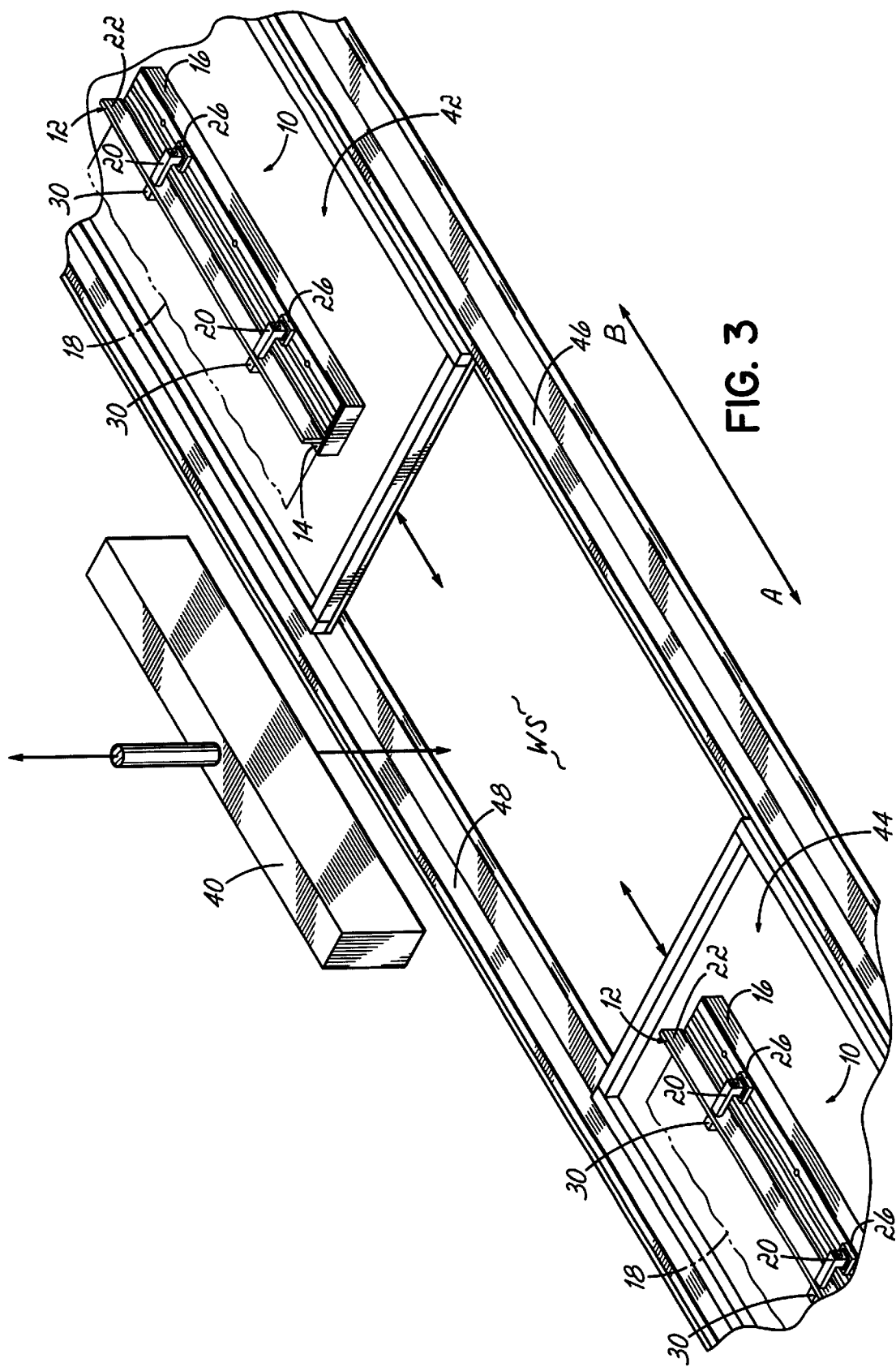
FIG. 3 is a perspective view depicting an embodiment of the present invention whereby a shuttle arrangement is used in conjunction with the apparatus of FIG. 1.

FIG. 3 illustrates another embodiment of the present invention whereby R-F welding fixtures 10 are used in conjunction with a shuttle 42. Referring to FIG. 3, fixture 10 is mounted to shuttle 42 so that a work surface 14, electrode 12, and workpiece 18 may be moved into and out of a welding station "WS" beneath a platen 40 of the press by sliding the shuttle 42 in Direction A on rails 46 and 48. In a more preferred embodiment, multiple shuttles 42, 44 and respective fixtures 10 are used with a press so that welding and workpiece positioning operations can be performed simultaneously on respective fixtures 10. In this embodiment, a first shuttle 42 and fixture 10 can be moved into welding station "WS" beneath the platen 40 for a welding operation while an operator positions one or more workpieces 18 on a second shuttle 44 and fixture 10 that remains outside the press platen 40. Shuttles 42 and 44 are alternately moved into and out of a welding station "WS" beneath the platen 40 so that welding and workpiece removal or loading operations can be performed on the respective fixtures 10 of the shuttles.

Accordingly, the present invention includes a method for using welding fixtures 10 and multiple shuttles 42 and 44 to weld flexible material workpieces 18, as follows. One or more workpieces 18 are oriented on work surfaces 14 by positioning the workpieces 18 under workpiece positioning members 34 and plates 37. Electrodes 12 are then oriented so that first electrode locating members 20 engage the corresponding bosses 26 of respective bases 16 and the second electrode positioning members 30 contact the workpieces 18. First shuttle 42, with work surface 14 and one or more electrodes 12 and workpieces 18, is then moved into welding station "WS" beneath platen 40 by sliding first shuttle 42 in direction A on rails 46 and 48. Platen 40 is lowered to compress the electrodes 12 onto the workpieces 18 and radio-frequency energy is applied to the electrodes 12, while other workpieces 18 are being removed or loaded onto one or more fixtures 10 of second shuttle 44. After the workpieces 18 on first shuttle 42 have been R-F welded, the platen 40 is raised and first shuttle 42 is moved out of the welding station "WS" by sliding first shuttle 42 in direction B on rails 46 and 48, while second shuttle 44 is moved into welding station "WS" beneath platen 40 by sliding shuttle 44 in direction B on rails 46 and 48. Electrodes 12 and welded workpieces 18 are removed from first shuttle 42 and unwelded workpieces 18 are oriented on the work surface 14 of first shuttle 42 while the workpieces 18 of second shuttle 44 are being welded as described above.

Figure 4:
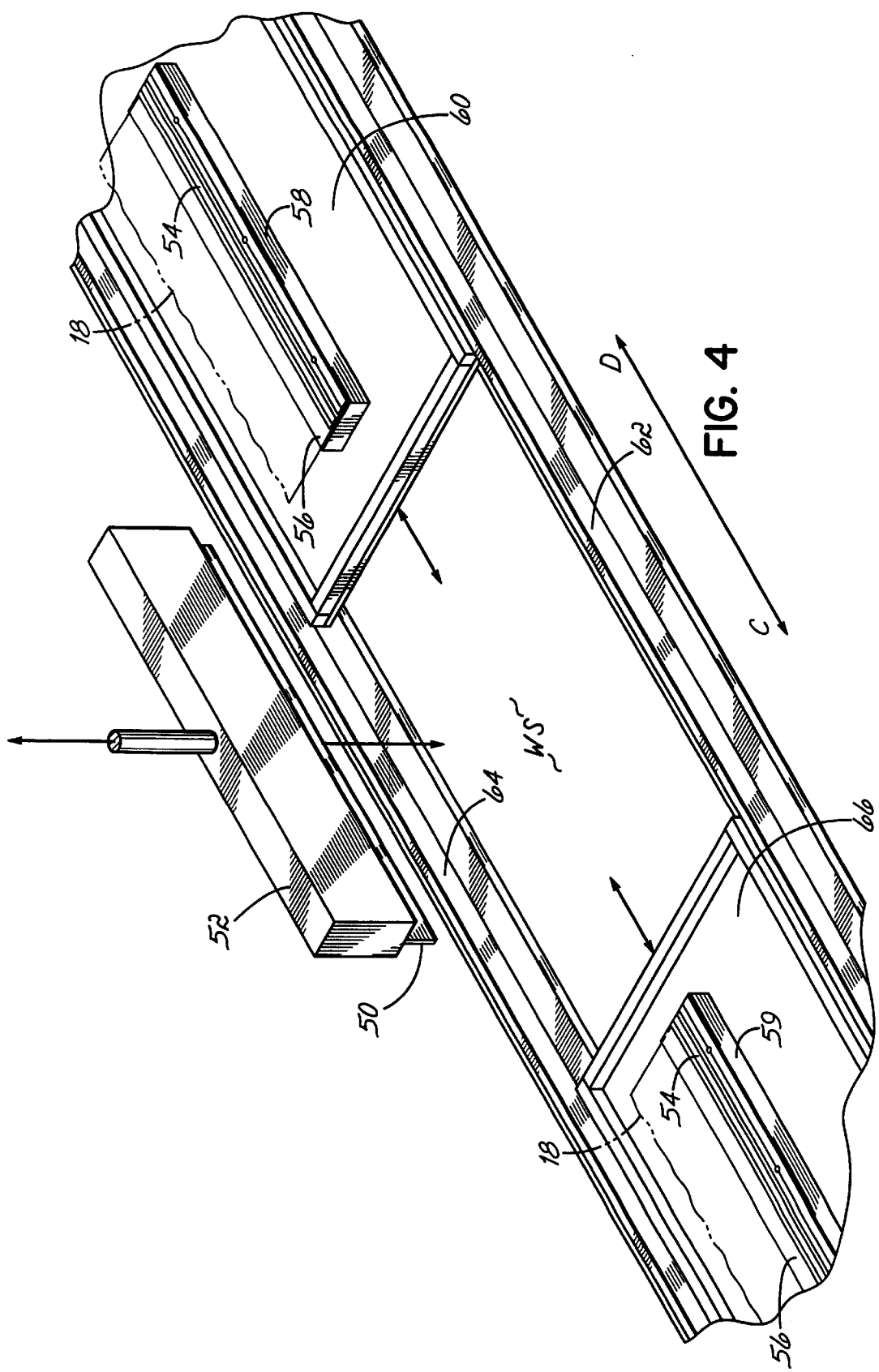
FIG. 4 is a perspective view depicting an embodiment of the present invention whereby a shuttle is used with a conventional bar press.

FIG. 4 depicts another embodiment of the present invention, whereby a shuttle system is used with a conventional R-F bar press to increase press utilization. Referring to FIG. 4, a conventional R-F bar press has an electrode 50 fixed to a moving first platen 52 of the press. A workpiece positioning jig 54 for orienting a flexible material workpiece 18 is mounted to a top surface 56 of a second platen 58. Workpiece positioning jig 54 and second platen 58 may be equivalent to fixture 10, described above, without electrode 12 and bosses 26, or they may be any other device suitable for holding and orienting workpiece 18 relative to moving electrode 50. Second platen 58 is in turn mounted on a shuttle 60 that can be slidably moved into and out of a welding station WS beneath the moving first platen 52 by sliding shuttle 60 on rails 62 and 64. In a more preferred embodiment, multiple shuttles 60 and 66 with second platens 58 and 59 and jigs 54 and 55 are used with a conventional R-F bar press.

Accordingly, the present invention includes a method using at least one shuttle and platen system with a conventional R-F bar press to increase press utilization. Referring to FIG. 4, workpiece 18 is positioned on a jig 54 mounted on second platen 58. Jig 54 orients and holds workpiece 18 to ensure proper alignment of the workpiece with electrode 50 fixed to a moving platen 52 of a bar press. Shuttle 60 is moved to a welding station WS beneath platen 52 and electrode 50 by sliding the shuttle 60 in direction C on rails 62 and 64. Platen 52 and electrode 50 are then lowered to compress workpiece 18 and radio-frequency energy is applied to electrode 50 to weld workpiece 18. After welding, platen 52 and electrode 50 are raised and shuttle 60 is moved out of the welding station WS by sliding shuttle 60 in direction B on rails 62 and 64 so that workpiece 18 can be removed from jig 54. In a more preferred embodiment, multiple shuttles 60 and 66, with respective second platens 58 and 59 and jigs 54 and 55, are used with a conventional R-F bar press, alternately moving shuttles 60 and 66 into and out of welding station WS beneath moving platen 52 and electrode 50 to permit simultaneous welding and workpiece removal or loading operations, as described previously.

It will be appreciated that these and other embodiments and modifications will be readily apparent to those of ordinary skill in the art without departing from the scope of the invention, and the applicant intends to be bound only by the claims appended hereto.

What is claimed is:

1. A radio-frequency welding press for welding flexible material workpieces, the press comprising:
   a base having a work surface disposed thereon;
   a radio-frequency welding electrode removably disposed proximate said work surface;
   said base including positioning apparatus for locating the electrode relative to the work surface;
   at least one locating member attached to the electrode for operatively engaging the positioning apparatus; and
   a workpiece positioning member on said base for locating a workpiece relative to the work surface of the base, between said electrode and said work surface; and
   said base, electrode, and workpiece positioning member being moveable to a position proximate a platen of said press whereby said platen can engage and press said electrode onto said workpiece for welding.

2. The press of claim 1 further comprising a shuttle slidably mounted to said press for movement beneath and away from a platen of said press; said base, electrode, and workpiece being mounted on said shuttle and slidably moveable selectively beneath and away from said platen when said shuttle is moved.

3. A press as in claim 1 further including:
   a plurality of bases;
   a plurality of work surfaces disposed on each base;
   a plurality of radio-frequency welding electrodes each removably disposed on a respective work surface;
   each of said bases including positioning apparatus for locating a respective electrode relative to a respective work surface;
   at least one locating member attached to each of said electrodes for operatively engaging a respective positioning apparatus on a respective base; and
   at least one workpiece positioning member attached to each base for locating workpieces relative to the work surface of each base beneath said respective electrode.

4. The press of claim 3 further comprising at least one shuttle slidably mounted to said press for movement toward and away from a position proximate a platen of said press, said plurality of bases, electrodes, and workpieces being mounted to said at least one shuttle and slidably moveable selectively toward and away from said position when said at least one shuttle is moved.

5. A fixture apparatus for use with a radio-frequency welding press for welding flexible material workpieces, the apparatus comprising:
   a base having a work surface disposed thereon;
   a radio-frequency welding electrode removably disposed on the work surface;
   said base having positioning apparatus for locating the electrode relative to the work surface;
   at least one first electrode locating member operatively engaging the positioning apparatus and locating the electrode in a first plane relative to the work surface;
   at least a second electrode locating member locating the electrode in a second plane, the second plane oriented to intersect the first plane; and
   a workpiece positioning member attached to the base for locating a workpiece relative to the work surface of the base, between said electrode and said work surface.

6. A fixture apparatus for use with a radio-frequency welding press for welding flexible material workpieces, the apparatus comprising:
   a base having a work surface disposed thereon;
   said base having positioning apparatus;
   a radio-frequency welding electrode removably disposed on said base, the electrode having a first side and a second side;
   a plurality of first electrode locating members mounted to the first side of the electrode for operatively engaging the positioning apparatus to locate the electrode in a plane parallel to the work surface of the base;
   a plurality of second electrode locating members mounted to the second side of the electrode for locating the electrode in a plane perpendicular to the work surface of the base; and
   a workpiece positioning member attached to the base for locating a workpiece relative to the work surface of the base.

7. The apparatus of claim 6 wherein the positioning apparatus includes a plurality of recesses.

8. The apparatus of claim 7 wherein the workpiece positioning member includes:
   a hinged plate with at least a first portion of the plate in contact with the work surface of the base; and
   a recess formed into the first portion of the hinged plate for operatively engaging the workpiece.

9. The apparatus of claim 8 wherein the workpiece has a zipper and wherein the recess formed into the hinged plate is shaped to accommodate and index said zipper.

10. The apparatus of claim 9 further comprising a shuttle slidably mounted to said press for movement beneath and away from a platen of said press; said base, electrode, and workpiece being mounted to said shuttle and slidably moveable selectively beneath and away from said platen when said shuttle is moved.

11. A fixture apparatus for use with a radio-frequency welding press for welding flexible material workpieces, the apparatus comprising:
   a base having a work surface disposed thereon;
   a plurality of radio-frequency welding electrodes removably disposed on the work surface of the base, the electrodes having first sides and second sides;
   said base including positioning apparatus;
   a plurality of first electrode locating members attached to the first sides of respective electrodes for engaging the positioning apparatus and for locating a respective electrode in a plane parallel to the work surface of a respective base;
   a plurality of second electrode locating members attached to the second sides of respective electrodes for locating a respective electrode in a plane perpendicular to the work surface of a respective base; and a plurality of workpiece positioning members attached to the base for locating a plurality of workpieces relative to the work surface of the base, between said electrode and said work surface.

12. The apparatus of claim 11 wherein the workpiece positioning members include:

hinged plates with at least a first portion of the plates in contact with the work surface of the base; and recesses formed into the first portions of the hinged plates for operatively engaging the workpiece.

13. The apparatus of claim 12 wherein the workpieces have zippers and wherein the recesses formed into the hinged plates are shaped to accommodate and index said zippers.

14. The apparatus of claim 13 further comprising a shuttle slidably mounted to said press for movement toward and away from a position proximate a platen of said press; said base, electrode, and workpiece being mounted to said shuttle and slidably moveable selectively toward and away from said position when said shuttle is moved.

15. A radio-frequency welding assembly comprising:

a press adapted to be used in radio-frequency welding operations;

at least one base having a work surface disposed thereon;

at least one radio-frequency welding electrode removably disposed on a respective base, each electrode having a first side and a second side;

each of said bases having positioning apparatus for locating a respective electrode relative to the work surface of a respective base;

at least one first electrode locating member attached to the first side of each respective electrode for operatively engaging a respective positioning apparatus to locate the electrode in a first plane relative to the work surface of a respective base;

at least one second electrode locating member attached to the second side of each respective electrode for locating the electrode in a plane perpendicular to the work surface of a respective base;

at least one workpiece positioning member attached to each of said bases for locating at least one workpiece relative to the work surface of a respective base; and at least one shuttle slidably mounted to said press for movement beneath and away from a platen of said press; said base, electrode, and workpiece being mounted to said shuttle and slidably moveable selectively beneath and away from said platen when said shuttle is moved.

16. A workpiece fixture for use in a welding press which has a moveable platen said fixture comprising:

a work surface for holding a workpiece, a workpiece positioning member mounted on said work surface for positioning a workpiece thereon, and a welding electrode disposed on said fixture over said workpiece, said fixture being moveable to an operating position in association with said platen for receiving pressure from said moveable platen, said electrode receiving welding energy from said platen.

17. The fixture of claim 16 the workpiece positioning member comprising:

a hinged plate with at least a first portion of the plate in contact with the work surface, and a recess formed into the first portion of the hinged plate for operatively engaging a margin of the workpiece.

18. The fixture of claim 17 wherein the workpiece has a zipper and the recess formed into the hinged plate is shaped to accommodate and index said zipper.

19. A workpiece fixture including an electrode for use in a welding press which press has a movable platen for pressing a welding electrode onto a workpiece and for transferring energy to a welding electrode for welding, said fixture including a welding electrode and a workpiece position member, said fixture including said welding electrode being disposable in a location spaced from said press and said platen, for positioning of a workpiece with respect to said electrode and workpiece position member at a location displaced away from said platen and being movable into an operable position with respect to said press and platen for receiving pressure and welding energy therefrom to energize said electrode and weld said workpiece.

20. The fixture of claim 19 further including a work surface on said fixture for holding the workpiece and workpiece positioning member, the workpiece positioning member comprising:

a hinged plate with at least a first portion of the plate in contact with the work surface; and a recess formed into the first portion of the hinged plate for operatively engaging the workpiece.

21. The fixture of claim 20 wherein the workpiece has a zipper and wherein the recess formed into the hinged plate is shaped to accommodate and index said zipper.

* * * * *